Patented Dec. 4, 1951

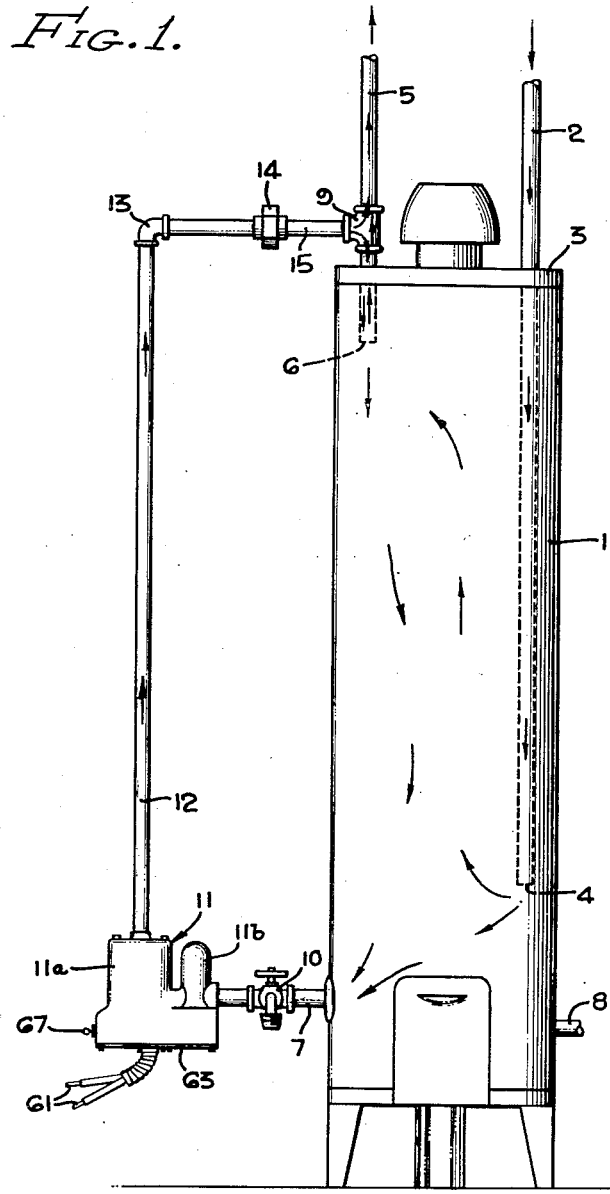

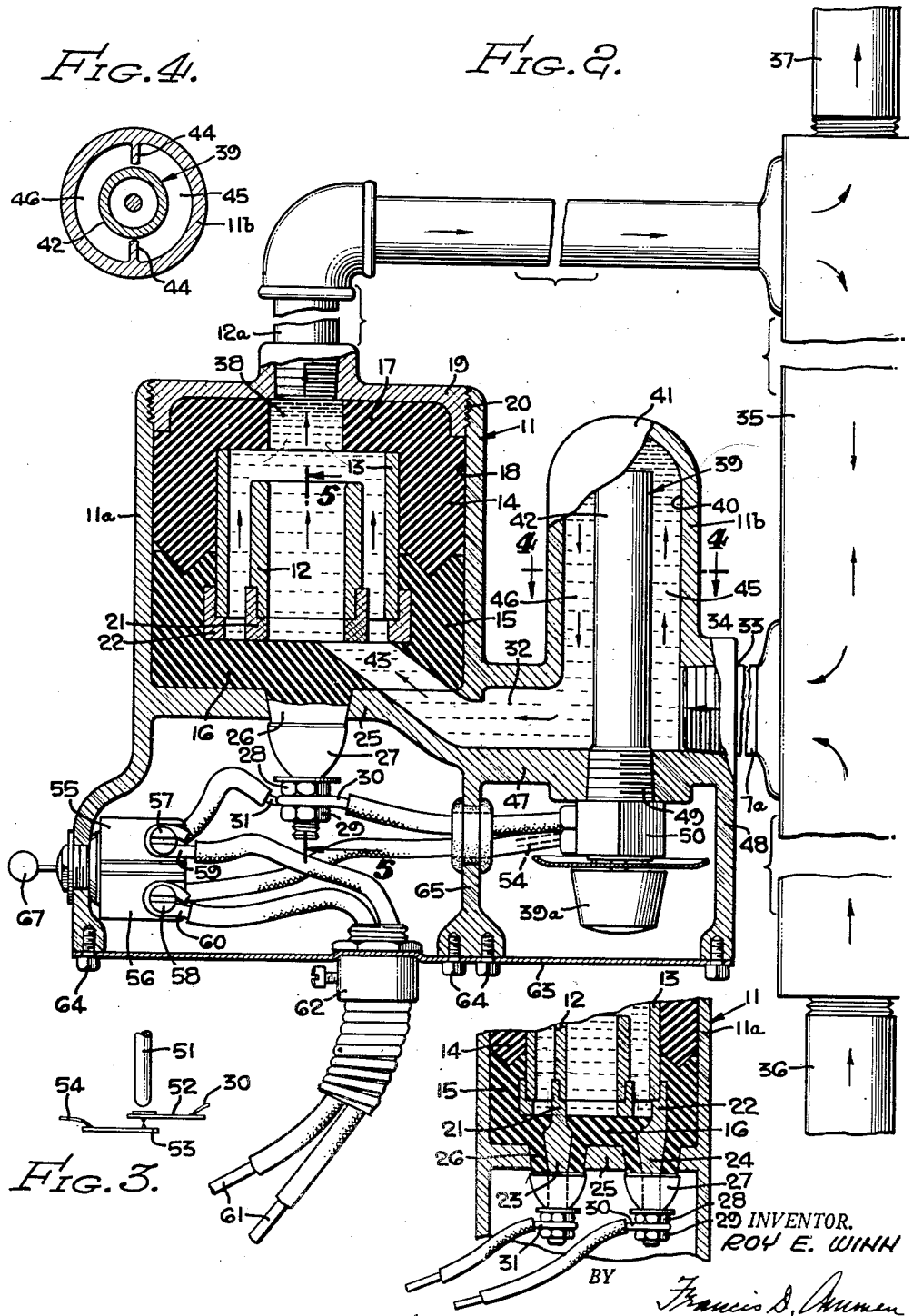

2,577,694

UNITED STATES PATENT OFFICE 2,577,694

HEATING APPARATUS

Roy E. Winn, Los Angeles, Calif.

Application November 14, 1947, Serial No. 785,836

9 Claims. (Cl. 219—39)

This invention relates to heaters, and particularly to heaters of a type which function to heat and maintain temperature in a tank. While the invention is illustrated in the accompanying drawings and described in the specification as applied to the heating of hot water held in a storage tank, the use of the invention is not limited to such purpose, and it can be used for maintaining the temperature of any liquid in a tank where the liquid is used for any industrial purposes.

One of the objects of the invention is to provide a heating apparatus of this type, which has features of construction that particularly adapt it for developing a circulation of the liquid being heated, from the tank through the heating device, and thence back into the tank at a level higher than the level at which the liquid flows from the tank into the heating device. One of the advantages of this invention is that it can be readily applied to the usual domestic type of storage tank, which is already in use. Such a type of storage tank can be converted from a gas-heated tank to an electric-heated tank without necessitating making any additional openings through the tank wall.

Another object of the invention is to provide heating apparatus of this type with improved means for effecting the control of the heating unit or heating device through the agency of a thermostat or thermostatically controlled device past which the water circulates in flowing to the heater from the tank.

Another object of the invention is to provide a heating unit having features of construction, which particularly adapt it for connection to a tank, as a unit, from which the piping extends to or from the tank; and to provide said unit with features of construction, which facilitate the cooperative action of the thermostat device and the heater device.

Another object of the invention is to improve the general construction of a heater unit in which a heater and a thermostat are mounted for cooperation in heating liquid passing through the same.

Another object of the invention is to provide heating apparatus with a thermostat chamber having a special construction adapting it to be employed with a tubular type of thermostatic device, and which faciltates the flow of the liquid being heated, throughout the entire length of the thermostatic device and on both sides of the same.

Further objects of the invention will appear hereinafter.

The invention consists in the novel parts and combinations of parts to be described hereinafter, all of which contribute to produce an efficient heating apparatus.

A preferred embodiment of the invention is described in the following specification, while the broad scope of the invention is pointed out in the appended claims.

In the drawings:

Fig. 1 is a side elevation of a heater apparatus of my invention, and illustrating the same, by way of example, as applied to a storage tank such as commonly used in household service. This view particularly illustrates how this heating apparatus can be readily incorporated so as to cooperate with a hot water storage tank which has already been installed and operating with a gas burner, to convert the same from a gas-burning heater to an electrically heated storage tank.

Fig. 2 is a view upon a larger scale, and illustrates the heater unit in vertical section, together with indicated pipe connections of a character which would adapt them to be used with an original tank and heater installation. Portions of the piping are broken away, and also the tank, to adapt their showing to the relatively large scale of the heater unit.

Fig. 3 is a diagrammatic view, and conventionally indicates how the heat-sensitive element can operate to close the electric circuit through the heating elements or electrodes of the heater.

Fig. 4 is a horizontal section taken about on the line 4—4 of Fig. 2, and further illustrating details of construction of the thermostat chamber, which will operate to effect the passage of the liquid through the thermostat chamber in such a way as to insure relatively quick reaction of the thermostat to the temperature of the passing liquid.

Fig. 5 is a vertical section taken about in the plane of the line 5—5 of Fig. 2, certain parts being broken away, and further illustrating the construction and arrangement of the terminals of the electrodes that cooperate to effect the heating of the water flowing through the heating chamber.

Referring particularly to Fig. 1, 1 indicates a storage tank such as commonly employed for household use. Such a tank is usually of elongated cylindrical form mounted with its axis in a vertical position so that there is a considerable difference in level between the bottom of the tank and its upper end. Such a tank is usually supplied with cold water through a down pipe 2, which passes through the upper head 3 of the tank and extends down to a low level, where the cold water is delivered through the delivery mouth 4 of this pipe.

Storage tanks such as this are also usually provided with a hot water outlet pipe 5 that extends up through the upper head 3, and has its lower end disposed at a high level such as that indicated at 6. Such a tank is also usually provided with a drain outlet 7 that is provided with a valve enabling the water chamber in the tank to be drained out and cleaned when necessary.

Many storage tanks of this type are in use, which are heated by a gas burner within them and located at their lower end below the bottom water head of the water chamber. The gas burner referred to is not illustrated, but is usually supplied with gas through a gas connection including an inlet pipe 8, and an inlet valve (not illustrated).

In applying my invention to such a storage tank, I introduced a T connection 9 in the hot water outlet pipe 5, and at the lower end I attach a three-way cock or valve 10 to the drain outlet 7. Between the T connection 9 and the valve 10 I mount my heating apparatus, which includes a casing 11. This casing includes a heating chamber in which liquid from the tank which, in the present case would be water, is heated; and from the heating chamber an uptake pipe 12 passes upwardly. Through an elbow 13, a coupling 14, and a horizontal pipe extension 15, this uptake is connected to the side of the T connection 9.

In Fig. 2 I illustrate all of the heating apparatus that is illustrated in Fig. 1, but in this view the apparatus is illustrated as though attached through the side wall of a tank as it could be when used as an original installation with the tank.

Referring now to Fig. 2, the casing 11 preferably includes two sections 11a and 11b, which may be conveniently cast integrally with each other, with their axes parallel. The section 11a is of substantially cylindrical form to receive the heating means which, in this case, comprises two electrodes 12 and 13, which are mounted in a heating chamber formed between two sections 14 and 15 of insulation, the latter of which is formed integral with a bottom head 16, and the former of which is formed integral with a cover head 17. The bore 18 of the section 11a of the casing 11 is closed above by a cap 19, which is preferably secured in position by means of the screw thread connection 20. The sections 14 and 15 of the insulation are separable, and fit together so that the upper section centers itself on the lower section. For this purpose the upper edge of the peripheral wall of the lower section 15 is formed with a V-shaped groove into which the V-shaped bottom edge of the upper section 14 fits, as illustrated in Fig. 2.

The electrodes 12 and 13 are in the form of sleeves of conductive material such as a suitable metal, or metal alloy. At their lower ends they are seated in counterbores formed in two rings 21 and 22, which are mounted in the lower section 15 of the insulation, and these rings 21 and 22 have integral binding posts 23 and 24, respectively, which extend down through the bottom head 16 and project out below the metal bottom 25 of the casing, which forms the bottom head for the bore 18 of the heater. The openings for these terminals 23 and 24 through the metal head 25, are considerably larger than the cross-section of the terminals, so as to provide considerable space which is filled by insulation sleeves 26, which may be tapered as shown, to facilitate assembly of these parts. Copper or brass washers 27 may be employed to cover the end portions of the projecting electrodes, and the ends of the electrodes are threaded to enable them to receive terminal nuts 28 and 29 between which the ends of lead-in wires 30 and 31 are clamped.

The casting 11 is formed with a duct 32 having an inlet mouth 33 in which the pipe connection 7a may be secured by a thread connection 34, and this connection 7a is attached to the side wall of a tank 35, which may be an industrial tank used for any industrial purpose, and provided with an inlet 36 below for liquid, and a delivery service outlet 37 above. Although this inlet and outlet have been illustrated as located adjacent to the side wall 35 of the tank at which the connections are made to my heating device, it should be understood that in practice such connections can be located anywhere on the industrial tank 35, and either one of these pipe connections 36 and 37 could operate as an inlet, while the other one operates as an outlet for the liquid carried in the tank. And of course it should be understood that many liquids other than water can be carried in this industrial tank 35. The function of my heater in that case, would be merely to maintain the liquid within the tank at a uniform temperature. In order to accomplish this, I provide thermally controlled means in the path of the liquid that flows from the tank through the duct 32 to the water space between the electrodes, beyond which the heated water finds outlet through a passage 38 in the insulating head 17, which communicates with the uptake pipe 12a, that corresponds to the uptake pipe 12 illustrated in Fig. 1.

The section 11b operates as a housing for a thermostat 39, which is received in a tubular thermostat chamber 40 that is defined by the cylindrical side wall of the section 11b and its dome-shaped head 41, which is formed integrally with the side wall. The thermostat 39 is preferably of a type which employs a tubular casing or barrel 42, which has a relatively high coefficient of expansion when its temperature changes. The barrel 42 is of substantially uniform cross-section or diameter. In accordance with my invention I provide means for causing the inflowing current of liquid to pass upwardly along one side of the thermostat barrel 42 and thence downwardly on the other side, so that substantially the entire superficial area of the tube 42 is in contact with the inflowing current. After the liquid has passed down the return duct on the left side of the thermostat barrel 42, it passes back into the duct 32 and then passes by an inclined duct 43 into the water space within and surrounding the inner electrode 12. In order to accomplish this, I prefer to provide the circumferential wall of the section 11b with two diametrically opposite inwardly projecting fins 44 (see Fig. 4). The inner edges of these fins lie substantially against the side wall of the tube 42 so that they co-operate with the tube or barrel 42 to form two ducts 45 and 46, in the form of which the liquid flows upwardly, and in the latter of which it flows downwardly.

The bottom wall of the duct 32 and the duct 43 in the casting 11, is preferably formed as an extension of the bottom head 25 of the section 11a, so as to form a bottom wall for the duct 43 and a head or bottom 47 that extends across to the side or end 48 of the casting 11 at which the inlet opening 33 is located.

The thermostat 39 is removably mounted in this bottom 47 in any suitable manner. In the present illustration, this is done by means of a tapered thread connection 49 below which the thermostat includes a contact head 50 in which the contacts are located, that are controlled by the thermostat to close the electric circuit through the electrodes 12 and 13 when the temperature of the liquid in the tank and in the ducts 45 and 46 falls to the low limit for which the thermostat is set.

Thermostats of this type are obtainable in the open market, and the construction and arrangement of their contacts are well known. However, in Fig. 3 I illustrate a rod 51 of Invar metal, the upper end of which is carried by the upper end or head of the barrel 42 by a connection, not illustrated. When the temperature of the wall of the barrel 42 drops to the low limit for which the thermostat is set, the end of the Invar rod may engage a movable contact 52 that is connected to the lead-in wire 30, and pushes it down against a relatively fixed contact 53. This contact 53 is connected to a lead-in wire 54.

The lead-in wire 31 and this lead-in wire 54 are connected to an insulated switch 55 at which they are electrically connected by means of clamping screws 57 and 58 to the ends 59 and 60 of circuit wires 61, which are insulated and which pass up through an insulating bushing 62 in a removable bottom plate 63 that closes in all of the wiring and the thermostat.

Thermostats of the type described are usually provided with an adjusting head 39a, which can be rotated to set the thermostat to close the circuit at any desired temperature for the liquid standing in the water chamber 40 of the thermostat housing. The bottom plate 63 may be held in place by screws or small bolts 64. If desired, the under side of the bottom 47 may be provided with an integral web or wall 65 that projects downwardly. The bottom of this wall is finished off to give a seat for the middle portion of the bottom plate 63 at which some of the small bolts 64 may be employed, and this of course insures that the bottom plate 63 will easily support the weight of any wiring, or accessory parts, included with the wires or conductors 61. Associated with the insulated switch 55 if desired, a switch handle 67 may be provided on the outside, which operates the switch to pass the electric current to the electrode terminals.

In the operation of this heater, the water is heated by current that passes through the annular water spaced between the cylindrical electrodes 12 and 13, and the heating is effected by reason of the resistance of the liquid to the passage of the current. The thermostat of course closes the circuit at the low limit of the temperature of the liquid in the tank 35, which of course is substantially the same as the liquid in the water chamber 40 of the thermostat housing.

In the operation of this heater, as soon as the current commences to pass between the electrodes, the liquid in the space between them becomes heated. The air in the water expands immediately, and this water therefore flows upwardly in the uptake pipe 12 or 12a. The heating effect may be sufficient to cause steam if desired; then of course the upward flow in the uptake pipes 12 or 12a will be greatly accelerated. If the heating apparatus is attached to an industrial tank such as that illustrated in Fig. 2, it will operate to maintain the temperature in this tank according to the set position of the thermostat. In considering the operation of the heating apparatus when applied to a domestic or household water tank such as illustrated in Fig. 1, it should be understood that the hot water pipe 5 ordinarily leads to a hot water faucet, and as soon as the hot water faucet is turned on, water commences to flow from the tank 1 up through the lower end of the pipe 5. This of course causes an inflow of cold water into the tank through the cold water pipe 2, and reduces the temperature of water in the bottom of the tank. This lower temperature is immediately communicated to the water in the thermostat chamber 40. This communication of temperature, however, is accelerated due to the fact that as the hot water flows up through the hot water pipe 5, it immediately entrains water from the horizontal pipe connection 15, thereby reducing the hydrostatic head in the column of water standing in the uptake pipe 12, so that as soon as the hot water faucet is open, a flow of water is immediately developed through the connection 7 and the casing 11, including the section 11b which houses the thermostat. This of course gives a very quick response of the thermostat to the necessity for closing the circuit to commence heating the water in the tank and the water going to the hot water faucet as soon as the hot water faucet has been opened.

However, when the hot water faucet is turned off, the thermostatic control quickly restores the temperature in the tank 1 to the normal high limit of the temperature for which it is set. At this time, however, circulation from the tank through the heater and back to the upper end of the tank is developed by reason of the relative lightness of the water column in the uptake pipe 12 due to the fact that this water has been heated in the heating chamber of the heater.

Many other embodiments of the invention may be resorted to without departing from the spirit of the invention.

I claim as my invention:

1. In electric heating apparatus for heating and maintaining liquid in a storage tank at a substantially uniform temperature, the combination of a storage tank having a hot-liquid outlet from the same, an electric heater having a casing with a heating chamber, a liquid inlet to said heater connected from the tank at a low level, an uptake outlet for the liquid from the said electric heater, means connecting said hot-liquid outlet to the tank at a higher level, and a thermally-controlled device having a duct within which the thermally sensitive element is mounted, located in the line of flow of the water passing from the tank to the heating chamber of the electric heater, past which all the circulating water passes, and operating to close the heating circuit through the heater at a predetermined temperature; said heater co-operating with said uptake to induce an upward flow of water in the uptake.

2. An electrical heating apparatus according to claim 1, in which the connection from the hot liquid outlet to the tank passes through the side wall of the tank adjacent its upper head and in which the hot water outlet from the tank is located in the upper head of the tank and adjacent to the point of connection from the hot liquid outlet to the tank.

3. Electric heating apparatus according to claim 1, including a thermostat chamber, and in which the thermally controlled device is removably mounted, and includes an elongated thermally sensitive part, said thermostat chamber having means for causing the water passing through the same to pass longitudinally along said heat-sensitive part on one side of the same, and return on the other side thereof.

4. In electric heating apparatus, to cooperate with a storage tank, the combination of a heater casing having a heater housing with a heating chamber therein, electrically activated heating means within said heating chamber for heating liquid in said chamber, said casing including a thermostat housing with a thermostat chamber therein for controlling an electric circuit to said heating means, said casing having a passage for the liquid connecting said thermostat chamber to said heating chamber; said thermostat housing having an inlet for conducting liquid from the storage tank through the thermostat chamber and into the heating chamber; and a substantially upright uptake connection from the heater housing through which the heated water flows upwardly with a lateral connection to the storage tank for delivering heated liquid to the tank from the heating chamber.

5. Electric heating apparatus according to claim 4 in which the said thermostat housing extends laterally from the direction of flow of the liquid in the said passage; said casing having a socket for removably mounting a thermostat to project longitudinally in the thermostat chamber; the side wall of said thermostat chamber having baffles extending longitudinally therein with their inner edges in a position to lie adjacent to the side of the thermostat, and operating to cause the liquid flowing through the thermostat chamber to flow outwardly toward the outer end of the thermostat chamber on one side of the thermostat, and flow inwardly on the other side thereof so as to return to the said passage and pass into the said heating chamber.

6. In electric heating apparatus, a casing having a heater housing with a heating chamber therein, electrically activated heating means within said heating chamber for heating liquid in said chamber, said casing including a thermostat housing with a thermostat chamber therein for controlling an electric circuit to said heating means, said casing having an inlet for the liquid to be heated, with a passage from said inlet leading toward said heating chamber, a thermostat removably mounted in said casing and having a substantially tubular barrel projecting into said thermostat chamber, the wall of said thermostat housing having integral fins projecting inwardly therefrom and lying substantially against the side of the barrel of the thermostat for causing the liquid to pass along the thermostat barrel toward its outer end on one side of said fins, and to return through the thermostat chamber on the other side of the fins, and to flow thence into the passage leading into the heating chamber.

7. Electric heating apparatus to cooperate with a storage tank, according to claim 4, including a service delivery outlet from the tank located with relation to the connection from the uptake into the tank so that a portion of the liquid flowing to the tank from the uptake, passes through the delivery outlet, and another portion thereof passes downwardly in the tank and toward the location of its connection to the heater to promote circulation of the liquid from the tank through the heater.

8. In heating apparatus, the combination of a substantially upright substantially cylindrical storage tank for hot liquid, an electric water heater located alongside the storage tank, a connection from the lower portion of the tank leading to the water heater, a thermostatic control device having a casing with a duct in which the thermally sensitive element is located so as to be in the direct line of flow of the circulating water, for controlling the supply of electric current to the electric heater, an outlet uptake for carrying an ascending column of hot liquid or steam from the heater to a higher level of the tank, a substantially vertical service outlet pipe connected into the tank adjacent its upper end, and a lateral pipe connection from the said uptake including a T connection into the side of the service pipe so that a portion of the heated water coming through said lateral connection passes up through the service outlet and a portion thereof passes downwardly into the tank above the location of its outlet to the heater to promote circulation of water through the heater and past the thermostatic control device.

9. In heating apparatus, the combination of a substantially upright substantially cylindrical storage tank for hot liquid, an electric water heater located alongside the storage tank, a connection from the lower portion of the tank leading to the same, a thermostatic control device having a casing with a duct in which the thermally sensitive element is located so as to be in the direct line of flow of the circulating water, for controlling the supply of electric current to the electric heater, an outlet uptake for carrying an ascending column of hot liquid or steam from the heater to a higher level of the tank, a substantially vertical service outlet pipe passing out through the upper head of the storage tank adjacent to the side wall thereof, and a lateral pipe connection from the said uptake connected through the said side wall of the tank below and adjacent to the point of connection of said service outlet pipe so that a portion of the heated water coming through said lateral connection passes up through the service outlet, and a portion thereof passes downwardly within the tank to promote circulation of water through the heater and past the thermostat control device.

ROY E. WINN.

REFERENCES CITED

The following references are of record in the file of this patent:

UNITED STATES PATENTS

| Number | Name | Date |
|---|---|---|
| Re. 19,175 | Fichtner | May 22, 1934 |
| 1,415,015 | Bosworth et al. | May 9, 1922 |
| 1,671,584 | Hicks et al. | May 29, 1928 |
| 1,693,182 | Rochester, Jr. | Nov. 27, 1928 |
| 1,699,738 | Kercher et al. | Jan. 22, 1929 |
| 1,731,058 | Pierson | Oct. 8, 1929 |
| 1,861,877 | Quill | June 7, 1932 |

FOREIGN PATENTS

| Number | Country | Date |
|---|---|---|
| 15,458 of 1928 | Australia | May 6, 1929 |